United States Patent [19]
Col et al.

[11] Patent Number: 6,108,773
[45] Date of Patent: Aug. 22, 2000

[54] APPARATUS AND METHOD FOR BRANCH TARGET ADDRESS CALCULATION DURING INSTRUCTION DECODE

[75] Inventors: Gerard M. Col; G. Glenn Henry, both of Austin, Tex.

[73] Assignee: IP-First, LLC, Fremont, Calif.

[21] Appl. No.: 09/052,624

[22] Filed: Mar. 31, 1998

[51] Int. Cl.[7] ........................................ G06F 9/32
[52] U.S. Cl. .................................................. 712/237
[58] Field of Search ................................. 712/237, 239

[56] References Cited

U.S. PATENT DOCUMENTS

| | | | |
|---|---|---|---|
| 5,740,416 | 4/1998 | McNahn | 712/238 |
| 5,822,574 | 10/1998 | Tran | 712/239 |

*Primary Examiner*—David Y. Eng
*Attorney, Agent, or Firm*—Richard K. Huffman; James W. Huffman

[57] ABSTRACT

An apparatus and method for improving the execution of conditional branch instructions is provided. A translator detects a conditional branch instruction during decode of the instruction, and provides a displacement to a target address calculator. The target address calculator calculates a target address for the branch instruction during decoding of the branch instruction by summing the displacement with a next instruction linear address. A signal is provided to indicate whether the target address is within a current code segment. The target address is provided to an instruction fetcher for use by the fetcher if it is predicted that the branch will be taken. Validation of the calculated target address is made by comparing the signal with the sign of the displacement.

34 Claims, 6 Drawing Sheets

*Execution of Conventional Conditional Jump*

| Cycle | Fetch | Translate | Register | Address | Data/ALU | Write Back |
|---|---|---|---|---|---|---|
| 1 | $I_1$ | *** | *** | *** | *** | *** |
| 2 | $I_2$ | $I_1$ | *** | *** | *** | *** |
| 3 | $I_3$ | $I_2$ | $i_1$ | *** | *** | *** |
| 4 | $I_4$ | $I_3$ | $i_2$ (Jcc) | $i_1$ | *** | *** |
| 5 | $I_5$ | $I_4$ | $i_3$ | $i_2$ (Jcc) | $i_1$ | *** |
| 6 | $I_6$ | $I_5$ | $i_4$ | $i_3$ | $i_2$ (Jcc) | $i_1$ |
| 7 | $I_{16}$ | -- | -- | -- | -- | $i_2$ (Jcc) |
| 8 | $I_{17}$ | $I_{16}$ | -- | -- | -- | -- |
| 9 | *** | $I_{17}$ | $i_{16}$ | -- | -- | -- |
| 10 | *** | *** | $i_{17}$ | $i_{16}$ | -- | -- |
| 11 | *** | *** | *** | $i_{17}$ | $i_{16}$ | -- |
| 12 | *** | *** | *** | *** | $i_{17}$ | $i_{16}$ |

5 CYCLES

FIG. 4 (Related Art)

Correctly Predicted Conditional Jump　　　400

| Cycle | Fetch | Translate | Register | Address | Data/ALU | Write Back |
|---|---|---|---|---|---|---|
| 1 | $I_1$ | *** | *** | *** | *** | *** |
| 2 | $I_2$ | $I_1$ | *** | *** | *** | *** |
| 3 | $I_3$ | $I_2$ | $i_1$ | *** | *** | *** |
| 4 | $I_{16}$ | *** | $i_2$ (Jcc) | $i_1$ | *** | *** |
| 5 | $I_{17}$ | $I_{16}$ | *** | $i_2$ (Jcc) | $i_1$ | *** |
| 6 | $I_{18}$ | $I_{17}$ | $i_{16}$ | *** | $i_2$ (Jcc) | $i_1$ |
| 7 | *** | $I_{18}$ | $i_{17}$ | $i_{16}$ | *** | $i_2$ (Jcc) |
| 8 | *** | *** | $i_{18}$ | $i_{17}$ | $i_{16}$ | *** |
| 9 | *** | *** | *** | $i_{18}$ | $i_{17}$ | $i_{16}$ |

2 CYCLES

FIG. 5

Target Address Calculation　　　500

| Branch Type | Target Address Components |
|---|---|
| Jcc | IP + Displacement |
| JMP | Displacement, Register, Memory |
| CALL | Displacement, Register, Memory |
| RTN | Call-Return Stack |

APPARATUS AND METHOD FOR BRANCH TARGET ADDRESS CALCULATION DURING INSTRUCTION DECODE

BACKGROUND OF THE INVENTION

1. Field of the Invention

This invention relates in general to the field of instruction execution in computers, and more particularly to an apparatus and method for calculating a target address for a branch instruction during decode of the branch instruction.

2. Description of the Related Art

Program instructions for a microprocessor are typically stored in sequential addressable locations within a memory. When processed, the instructions are fetched from consecutive memory locations and then executed. Each time an instruction is fetched from memory, a next instruction pointer within the microprocessor is updated so that it contains the address of the next instruction in the sequence. This is the next sequential instruction pointer, or NSIP. Sequential instruction fetching, updating of the next instruction pointer, and execution of sequential instructions continues linearly through memory until a program control instruction is encountered.

A program control instruction, when executed, changes the address in the next instruction pointer and causes the flow of the program to be altered. Program control instructions specify conditions for altering the contents of the next instruction pointer. Changing the contents of the next instruction pointer as a result of the execution of a program control instruction causes a break in the sequence of instruction execution. This is an important feature in digital computers, as it provides control over the flow of program execution and a capability for branching to different portions of a program. Examples of program control instructions include an unconditional jump instruction (JMP), a conditional jump instruction (Jcc), a call instruction (CALL), and a return instruction (RTN).

A JMP instruction causes the microprocessor to unconditionally change the contents of the next instruction pointer to a specified value, i.e., to an address at which point the program is continue execution. A Jcc instruction causes the microprocessor to test the contents of a status register, or possibly compare two values, and, based on the outcome of the test or comparison, either continue sequential execution or branch to a specified target address. A CALL instruction causes the microprocessor to unconditionally jump to a call address, but also saves the value of the next instruction pointer, to allow the microprocessor to return to the program location it leaves. An RTN instruction causes the microprocessor to retrieve the value of the next instruction pointer that was saved by the last executed CALL instruction, and return program flow back to the retrieved next sequential instruction address.

In early microprocessors, execution of program control instructions did not impose significant processing delays because these microprocessors executed only one instruction at a time. If the instruction executed was a program control instruction, then by the end of execution the microprocessor would know whether it should branch, and if it was supposed to branch, it would have determined the target address for the branch. Thus, whether the next instruction was sequential, or the result of a branch, it would be fetched and executed.

Present day microprocessors are not so simple. Rather, it is common for present day microprocessors to operate on several instructions at the same time, within different blocks, or pipeline stages, of a microprocessor. As instructions are fetched, they are introduced into one end of the pipeline. They proceed through successive pipeline stages within a microprocessor until they complete execution. In such pipelined microprocessors, it is often not known whether a branch instruction will alter program flow until it reaches a late stage in the pipeline. But by this time, the microprocessor has already fetched more sequential instructions and is executing them in earlier stages of the pipeline. If a branch causes a change in program flow, then all of the sequential instructions in the pipeline that followed the branch must be thrown out. In addition, the instruction specified by the target address of the branch instruction must be fetched. Throwing out the intermediate instructions, and fetching the instruction at the target address creates processing delays in such microprocessors.

To alleviate this delay problem, many pipeline microprocessors use branch prediction mechanisms in an early stage of the pipeline that predict the outcome of branch instructions, and then fetch subsequent instructions according to the branch prediction. For example, see "*Alternative Implementations of Two-Level Adaptive Branch Prediction,*" by T.-Y. Yeh and Y. N. Patt, from *Proceedings of the 19th Annual International Symposium on Computer Architecture*, ACM, New York, N.Y., 1992, pages 124–134. Most branch prediction mechanisms operate by dynamically maintaining the outcome history of previous branches, and predictions are made based upon the stored branch history.

However, use of such branch prediction mechanisms are costly, both in terms of the hardware required to historically track a significant number of branch instructions, as well as in the processing delays imposed when such prediction mechanisms are erroneous.

Therefore, what is needed is an apparatus and method that accurately calculates a target addresses for a branch instruction in an early stage of the pipeline. In addition, what is needed is an apparatus and method that calculates a target address without requiring the complex hardware commensurate with conventional branch prediction techniques.

SUMMARY

To address the above-detailed deficiencies, it is an object of the present invention to provide an apparatus and method that calculates the target address for conditional branch instructions during decode of the instruction.

Accordingly, in the attainment of the aforementioned object, it is a feature of the present invention to provide a microprocessor for executing conditional branch instructions. The microprocessor includes translation logic that receives a conditional branch macro instruction having an associated displacement and translates the conditional branch macro instruction into a conditional branch micro instruction. The translation logic has a translator, a target address calculator, and potential overflow/underflow detection logic. The translator detects the conditional branch macro instruction. The target address calculator is coupled to the translator. The target address calculator receives the associated displacement and arithmetically computes a target address for the conditional branch macro instruction, the target address being used to fetch subsequent macro instructions, if it is predicted that a corresponding branch will be taken. The potential overflow/underflow detection logic is coupled to the target address calculator. The potential overflow/underflow detection logic provides a signal to a subsequent pipeline stage within the microprocessor indicating whether the target address is within a current code segment. The subsequent pipeline stage within the microprocessor compares the signal with a sign of the associated displacement to determine whether the target address was accurately computed, and if the target address was not accurately computed, the subsequent pipeline stage provides an accurate target address to the microprocessor, the accurate target address being used to fetch correct subsequent macro instructions. By calculating the target address within the translation logic, the microprocessor begins fetching macro instructions from the target address prior to the subsequent pipeline stage determining whether the target address was accurately computed.

An advantage of the present invention is that a target address is calculated during instruction decode, without requiring a branch target buffer.

Another object of the present invention is to provide an apparatus and method for calculating a target address during instruction translation without causing any delay to the translation process.

In another aspect, it is a feature of the present invention to provide a pipeline microprocessor, for executing a conditional_branch operation to discontinue sequential instruction fetching and to begin instruction fetching at a branch target address. The pipeline microprocessor has translation logic and a target address resolver. The translation logic receives a conditional branch macro instruction having an associated displacement, and translates the conditional branch_macro instruction into a conditional branch micro instruction. The translation logic includes an instruction decoder, a target address calculator, and potential overflow/underflow detection logic. The instruction decoder detects whether the conditional branch macro instruction specifies the conditional branch operation directing program flow to the branch target address, the branch target address being relatively offset from a next sequential instruction linear address by a number of bytes prescribed by the associated displacement. The target address calculator is coupled to the instruction decoder and calculates the branch target address for the conditional branch operation. The potential overflow/underflow detection logic is coupled to the target address calculator. The potential overflow/underflow detection logic provides a signal to a subsequent pipeline stage within the pipeline microprocessor indicating whether the branch target address, as calculated by the target address calculator, is within a current code segment. The target address resolver is coupled to the potential overflow/underflow detection logic, and resides within the subsequent pipeline stage. The target address resolver determines whether the branch target address was accurately calculated by comparing a sign of the associated displacement with the signal, wherein, if it is determined that the branch target address was not accurately calculated, the target address resolver provides a corrected branch target address to instruction fetch logic in the pipeline microprocessor to enable instruction fetching at the branch target address. By calculating the branch target address within the translation logic, the pipeline microprocessor begins fetching instructions from the branch target address prior to when the target address resolver determines whether or not the branch target address was accurately calculated.

Another advantage of the present invention is that a target address is calculated in the translate stage of a microprocessor, thus allowing instruction fetching prior to resolution of a branch instruction.

Yet another object of the present invention is to provide an apparatus and method for calculation of a target address for a conditional branch instruction without requiring complex hardware to store historical targets associated with previous executions of the instruction.

In yet another aspect, it is a feature of the present invention to provide microprocessor for calculating a target address for a conditional branch instruction. The microprocessor includes instruction fetch logic and translation logic. The instruction fetch logic fetches the conditional branch instruction from a memory. The translation logic is coupled to the instruction fetch logic. The translation logic receives the conditional branch instruction, and extracts a displacement from the conditional branch instruction. The translation logic has a branch table, a target address calculator, and potential overflow/underflow detection logic. The branch table indicates whether or not a branch corresponding to the conditional branch instruction should be taken. The target address calculator is coupled to the branch table. The target address calculator calculates the target address, and to provide the target address to the instruction fetch logic for fetching of a subsequent instruction if said branch table indicates that said branch should be taken. The potential overflow/underflow detection logic is coupled to the target address calculator and provides a signal to a target address resolver indicating whether the target address is within a current code segment. The target address resolver receives the signal from the potential overflow/underflow detection logic and confirms whether the target address is within the current code segment, and if the target address is not within said current code segment, the target address resolver provides an accurate target address to the instruction fetch logic. The target address is calculated and provided to the instruction fetch logic prior to when the target address resolver confirms whether the target address is within the current code segment.

In a further aspect, it is a feature of the present invention to provide a method for executing a conditional branch corresponding to a conditional branch instruction in a pipeline microprocessor. The method includes, while the conditional branch instruction is being decoded into a conditional branch micro instruction, if branch prediction logic indicates that the conditional branch is to be taken, calculating a target address for the conditional branch, and providing a signal for use by a subsequent pipeline stage that indicates whether or not a half-carry was produced by said calculating; prior to when the conditional branch micro instruction is provided to the subsequent pipeline stage, providing the target address to an instruction fetcher for fetching of subsequent instructions; when the conditional branch micro instruction proceeds through the subsequent pipeline stage, validating whether or not the target address provided by said calculating is accurate; and if said validating indicates that the target address is not accurate, replacing the target address with an accurately calculated target address.

Another advantage of the present invention is that an instruction fetcher can begin fetching instructions from a calculated target location prior to the point in time when it is determined that the branch will be taken.

Another advantage of the present invention is that an instruction fetcher can begin fetching instructions from a calculated target location prior to the point in time when it is determined that the branch will be taken.

BRIEF DESCRIPTION OF THE DRAWINGS

These and other objects, features, and advantages of the present invention will become better understood with regard to the following description, and accompanying drawings where:

FIG. 4 is a table illustrating timing of a correctly predicted branch instruction by the microprocessor of FIG. 3.

FIG. 5 is a table illustrating target address calculation parameters for different types of branch instructions.

DETAILED DESCRIPTION

In light of the above background on conditional branching in pipeline microprocessors, a specific example illustrating the delay problem within a related art pipeline microprocessor will now be described, with reference to FIG. 1 through FIG. 4. After the problem has been described, a detailed description of the present invention that solves this delay problem will be provided.

Figures 1, 2:
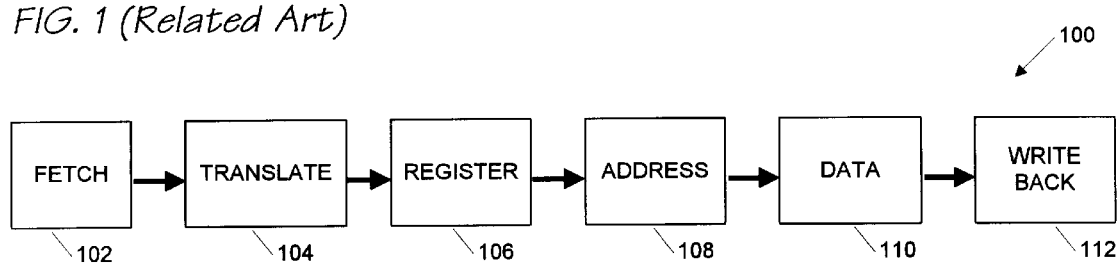
FIG. 1 is a block diagram illustrating processing stages within a related art pipeline microprocessor.
FIG. 2 is a table illustrating pipeline delays resulting from the execution of a related art branch instruction.

FIG. 1 illustrates a six-stage pipeline microprocessor 100. The microprocessor 100 includes a fetch stage 102, translate stage 104, register stage 106, address stage 108, data/ALU stage 110 and write back stage 112.

Operationally, the fetch stage 102 fetches instructions from memory (not shown) that are to be executed by the microprocessor 100. The translate stage 104 translates, or decodes, the fetched instructions into associated micro instructions, each directing the microprocessor 100 to perform a specific subtask related to accomplishment of an overall operation specified by a fetched macro instruction. The register stage 106 retrieves operands specified by the micro instructions from a register file (not shown) for use by later stages in the pipeline. The address stage 108 calculates memory addresses specified by the micro instructions to be used in data storage and retrieval operations. The data/ALU stage 110 either performs ALU operations on data retrieved from the register file, or reads/writes data from/to memory using the memory address calculated in the address stage 108. The write back stage 112 writes the result of a data read operation, or an ALU operation, to the register file or to a memory location. Thus, macro instructions are fetched by the fetch stage 102, translated into micro instructions by the translate stage 104, and the micro instructions proceed through stages 106–112 for execution.

Micro instructions move through successive stages of the microprocessor pipeline in synchronization with a microprocessor clock. Optimally, while any given stage in the pipeline is executing a micro instruction, the previous stage should be executing the next micro instruction.

Now referring to FIG. 2, table 200 illustrates progression of a sequence of instructions through the stages of the pipeline microprocessor of FIG. 1. Macro instructions are designated as $I_1$, $I_2$, $I_3$, etc. Each macro instruction is translated into a single micro instruction, designated by $i_1$, $i_2$, $i_3$, etc. In practice, most macro instructions are translated into more than one micro instruction, but for ease of discussion only one micro instruction per macro instruction is shown. Instructions that precede and follow instructions of interest are designated by "*** ". Voids in the pipeline are designated by "--." Progression of instructions through each stage of the pipeline is shown with respect to cycles of a microprocessor clock. Although some instructions require more than one clock cycle to execute in a given stage of the pipeline, for illustration clarity, all instructions in the table 200 are shown to proceed through each pipeline stage in a single clock cycle.

Beginning at clock cycle 1, a first macro instruction, $I_1$, is fetched from memory by the fetch stage 102 and is provided to the translate stage 104.

In clock cycle 2, the first macro instruction, $I_1$, is translated by the translate stage 104 into a first micro instruction, $i_1$, which is provided to the input of the register stage 106. Also during clock cycle 2, a second macro instruction, $I_2$, is fetched by the fetch stage 102 and is provided to the translate stage 104.

In clock cycle 3, the first micro instruction, $i_1$, proceeds through the register stage 106, the second macro instruction, $I_2$, is translated into a second micro instruction, $i_2$, in the translate stage 104, and a third macro instruction, $I_3$, is fetched.

Instructions are continuously fetched by the fetch stage 102, translated by the translate stage 104, and executed by the stages 106–112. This process continues until a program control instruction is executed, thus causing the fetch stage 102 to fetch a macro instruction that is not sequential. This case is particularly illustrated in clock cycle 6.

In clock cycles 4–7, a conditional branch micro instruction, $i_2$ (Jcc), is shown proceeding through stages 106–112. This conditional branch micro instruction indicates that a conditional jump is specified by conditional jump macro instruction $I_2$. During clock cycle 5, a target address for the associated conditional jump operation is calculated in the address stage 108. During clock cycle 6, the condition specified by the conditional jump operation, $i_2$ (Jcc), is tested. If the test fails, indicating that the jump should not be taken, the conditional branch micro instruction, $i_2$ (Jcc), proceeds through stages 110–112 and completes. If this were the case, the proceeding pipeline stages would already be filled with sequential instructions, and no processing delay would occur.

However, as shown in table 200, the test results in the condition has being met, so indicating that the jump, or branch, should be taken. Hence, the target address calculated by the address stage 108 during clock cycle 5 is provided to the fetch stage 102 at the end of clock cycle 6. Thus, during clock cycle 7 the fetch stage 102 uses the target address to retrieve macro instruction $I_{16}$, and provides macro instruction $I_{16}$ to the translate stage 104. Macro instruction $I_{16}$ is the target macro instruction prescribed by the conditional branch micro instruction, $i_2$ (Jcc).

When the above case occurs, all of the intermediate instructions, $i_3$–$I_6$ are flushed from the pipeline and the fetch stage 102 begins sequentially fetching macro instructions from the memory location that contains macro instruction $I_{16}$. Macro instructions are thereafter sequentially fetched until another program control instruction is executed.

As indicated adjacent to the Write Back column of table 200, five clock cycles are required to transition control from macro instruction $I_2$ to macro instruction $I_{16}$: one clock cycle is required to execute the conditional branch macro instruction and four voids in the pipeline are created. The voids are present Because the conditional branch macro instruction is resolved in the Data/ALU stage 110 and macro instruction $I_{16}$ is fetched in the fetch stage 102, the resulting delay causes the four voids to be presented in the pipeline.

A common technique for reducing voids in the pipeline is particularly illustrated with reference to FIG. 3 and FIG. 4.

Figure 3:
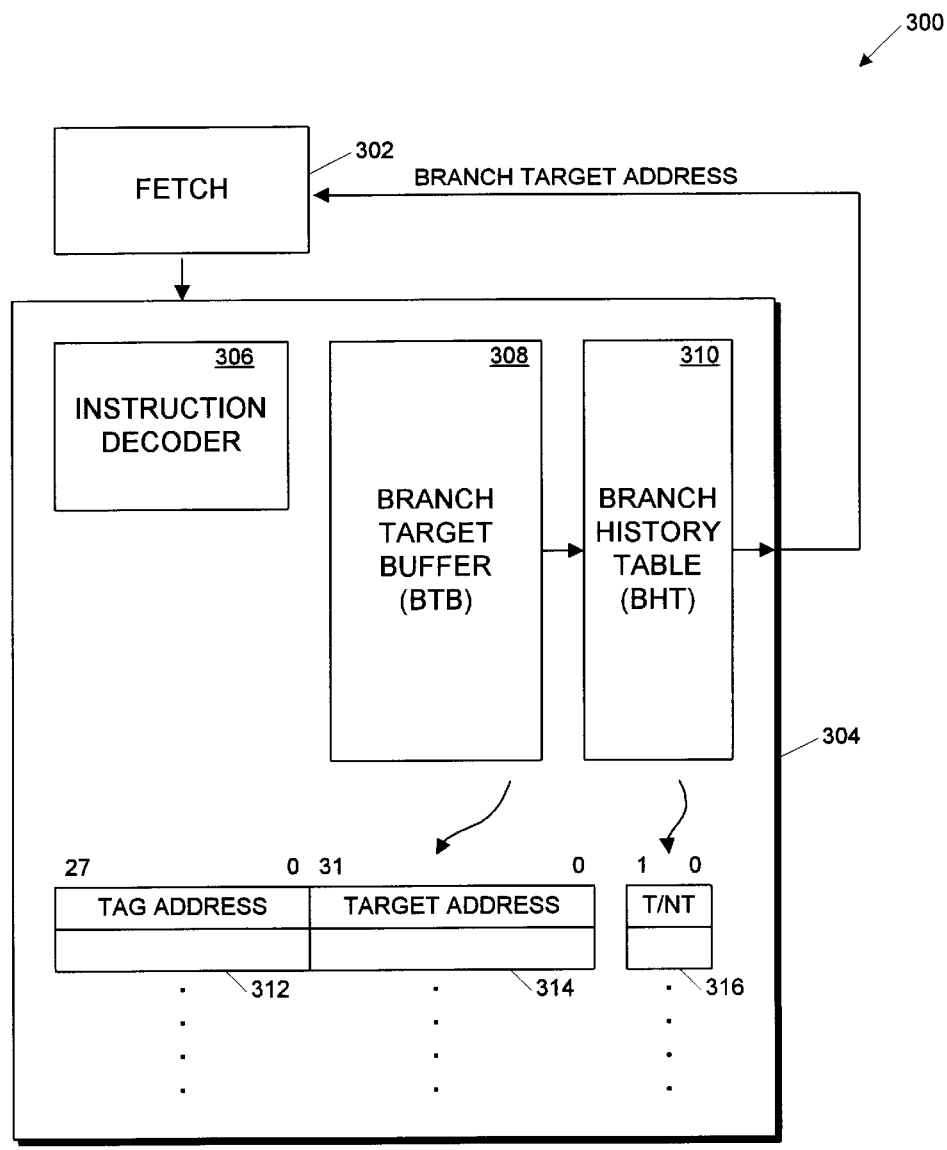
FIG. 3 is a block diagram of a portion of a microprocessor incorporating a related art technique for determining target addresses for branch instructions.

FIG. 3 depicts a portion of a pipeline microprocessor 300. The microprocessor 300 includes a fetch stage 302 and a translate stage 304. For ease of discussion, remaining stages of the microprocessor 300 are not shown.

The translate stage 304 includes an instruction decoder 306, a branch target buffer (BTB) 308 and a branch history table (BHT) 310. The instruction decoder 306 receives macro instructions from the fetch stage 302 and translates the macro instructions into associated micro instructions for execution by later stages in the pipeline. The BTB 308 is a table that includes an array of tag addresses 312, and an associated array of target addresses 314. Associated with the BTB 308 is an array 310 of BHT entries 316, each BHT entry 316 being two bits wide. The BTB 308 array can be of any size, but in the case of the Pentium® microprocessor, the BTB 308 contains 512 entries. Each entry contains a 28-bit tag address 312, and a 32-bit target address 314.

The tag address entry 312 is a memory address for a branch macro instruction that the microprocessor 300 desires to track. The target address 314 stores the memory address that was branched to during the previous execution of the branch macro instruction. The BHT 310 tracks whether the branch macro instruction caused a branch to be taken, or not taken, during the previous executions. By using a 2-bit entry 316, the BHT 310 can actually provide four different indications for whether an associated branch will be taken. These indications are strongly taken, weakly taken, weakly not taken, and strongly not taken.

In operation, when a macro instruction is fetched by the fetch stage 302 and provided to the translate stage 304, the instruction decoder 306 begins decoding the macro instruction. If the macro instruction is a branch instruction, then the memory address of the macro instruction is provided to the BTB 308 and BHT 310 to determine whether it caused branches during previous executions. If the address of the instruction is matched with one of the tag address entries 312, and if the associated BHT entry 316 predicts that the branch will be taken, then the BTB 308 provides the associated target address 314 back to the fetch stage 302. Recall, the target address 314 is the address to which the branch instruction jumped the last time it was executed. The target address 314 predicts the branch target address for the presently executing branch instruction. If the BHT entry 316 predicts that the branch will be taken, then the fetch stage 302 uses the associated target address 314 to fetch a following, or subsequent, macro instruction. If the BHT entry 316 predicts that the branch will not be taken, then the fetch stage 302 fetches the next sequential macro instruction in memory and continues fetching sequentially until another branch macro instruction is encountered. The technique of using a branch prediction buffer 308 in conjunction with a branch history table 310 to obviate voids in the pipeline is particularly exhibited with reference to FIG. 4.

FIG. 4 is a table 400, similar to that shown in FIG. 2, illustrating progression of a series of instructions, including a branch macro instruction, through the pipeline microprocessor 300. As before, a first macro instruction, $I_1$, is fetched from memory by the fetch stage 302 during clock cycle 1. Up to clock cycle 3, operation of the microprocessor 300 is the same as that described with reference to FIG. 1 and FIG. 2.

During clock cycle 3, second macro instruction, $I_2$, is within the translate stage 304. This instruction is a conditional branch instruction, like that shown in table 200. However, the address of the conditional branch instruction, $I_2$, is provided to the BTB 308 and BHT 310 to determine whether it has caused a branch operation in the past. In this example, a the tag address entry 312 of the BTB 308 matches the memory address for the conditional branch instruction, $I_2$. In addition, the associated BHT entry 316 indicates that the conditional branch instruction, $I_2$, will cause a branch. Hence, the associated target address 314 is provided to the fetch stage 302 as a predicted target address for the branch. Thus, at the end of clock cycle 3, the translate stage 304 provides the predicted target address, i.e., the memory address for macro instruction $I_{16}$, to the fetch stage 302. This will cause macro instruction $I_{16}$ to be fetched as a subsequent instruction.

During clock cycle 4, the subsequent macro instruction, $I_{16}$, is fetched. Program flow continues through clock cycle 9 where micro operation $i_{16}$ completes. In the example illustrated in FIG. 4, the conditional branch macro instruction, $I_2$, requires only two clock cycles to transfer control to the subsequent macro instruction, $I_{16}$, rather than the five clock cycles shown in table 200. This 3 cycle improvement was affected by incorporating a sizeable memory array within the translate stage 304 to track memory addresses for branch instructions, to predict whether a given branch will be taken or not taken, and to store previously generated target addresses. In some processors, the branch delay is reduced to just one clock cycle by tracking an instruction that precedes a particular branch instruction, and storing its address as the tag address in the BTB 308. By detecting a branch instruction one cycle before it enters the translate stage 304, the delay alleviated more than that shown in FIG. 4.

However, even if macro instruction $I_2$ previously caused a branch, the predicted target branch address can still be incorrect. If this is the case, then the address stage will calculate the actual target address, and this calculated target address will be provided back to the fetch stage 302 after the branch instruction completes execution in the data/ALU stage. The delay associated with this incorrectly predicted branch is the same as if no prediction technique had been used.

If macro instruction $I_2$ does not cause a branch, the delay is even worse under the BTB/BHT technique. In this instance, it would have been better to not predict the branch, and continue fetching sequentially, than to incorrectly predict because it would then become necessary to flush the pipeline again and begin fetching at the memory address following macro instruction $I_2$.

Thus, by using the BTB 308 and BHT 310 within the translate stage 304, an improvement is made in processing branch macro instructions when the predicted target is correct, and the prediction of whether the branch will be taken or not taken is also correct. However, the complex logic associated with this technique is costly.

Now referring to FIG. 5, a table 500 is shown that depicts four types of branch instructions. Three of the branch types are unconditional, i.e., JMP, CALL, and RTN. The fourth branch type, Jcc, indicates one of a number of different conditional branch instructions. Also shown in table 500 are the address components used to calculate target addresses for each of the four types of branch instructions. In general, the Jcc branch instruction is used for near jumps to memory locations within a current code segment. Thus, the conditional branch instruction specifies a condition to be met that will cause a jump, and a relative offset. The relative offset is commonly a signed integer value, specifying a memory address relative to the location of the next sequential instruction. The relative offset is also called a displacement and is provided in a immediate field of the conditional jump macro instruction. The conditional jump macro instruction also contains an opcode field that directs the microprocessor to execute the conditional jump operation. Typically, the relative offset is represented in 2's-complement format. Thus, an 8-bit signed relative offset can specify a branch target address relative to the next sequential instruction's address ranging from −128 to +127 bytes. Similarly, 16-bit displacements range from −32768 to +32767 bytes and 32-bit displacements range from $-2^{31}$ to $+2^{31}-1$.

Like the Jcc instruction, the JMP and CALL branch instructions may also prescribe the target address by specifying a displacement component. In addition, they can reference operand in either a register location or a memory location to be used as an address component for calculation of the target address. The RTN branch instruction utilizes a call-return stack to retrieve the target address. Because the conditional jump instruction, Jcc, provides a signed relative offset in addition to the opcode, and does not require access to a register or memory for computation of a branch target address, an embodiment of the present invention calculates a predicted target address for conditional branch instructions during the translate stage of a pipeline microprocessor, and eliminates the complex logic associated with implementation of a branch target buffer. This is particularly illustrated with reference to FIG. 6.

Figure 6:
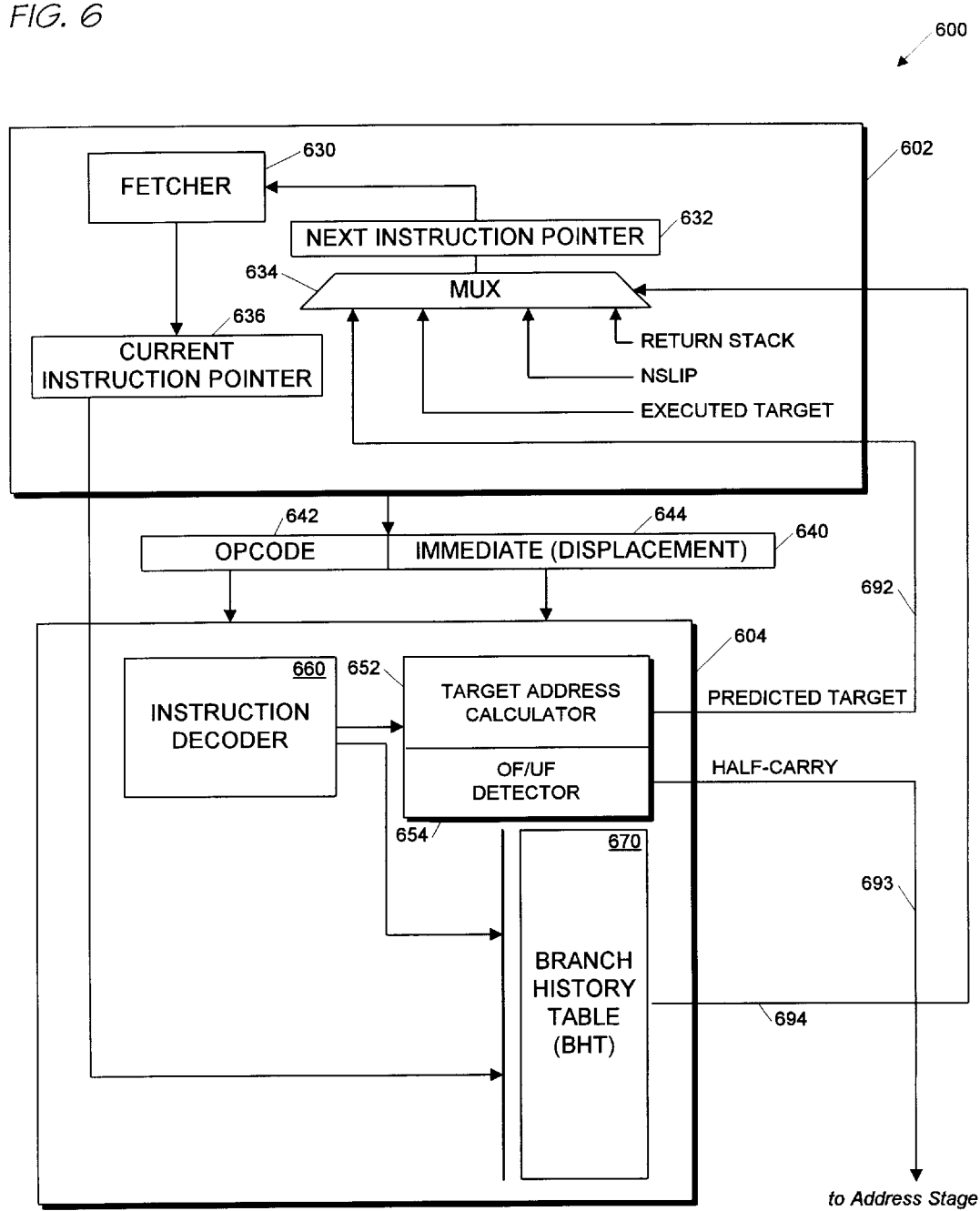
FIG. 6 is a block diagram of a target address calculation device according to the present invention, located within the translate stage of a pipeline microprocessor.

In FIG. 6, a portion of a microprocessor 600 is shown featuring a fetch stage 602 and a translate stage 604. Like that discussed above, the fetch stage 602 fetches macro instructions to be executed by the microprocessor 600. The fetch stage 602 provides the macro instructions to the translate stage 604. The translate stage 604 decodes the macro instructions into associated micro instructions for execution by later stages (not shown) in the microprocessor 600.

The fetch stage 602 has a fetcher 630 connected to a next instruction pointer 632, which is connected to a next address selector 634. The next instruction pointer 632 provides a next instruction address of a next instruction to be fetched by the fetcher 630. The contents of the next instruction pointer 632 are determined by the next address selector 634. The next address selector 634, in one embodiment of the present invention, is a mux 634 having four address inputs and a single output. A first input, NSLIP, provides the next sequential instruction linear address for the next instruction to be retrieved, if program flow proceeds sequentially. A second input, EXECUTED TARGET, provides a target address from a resolved branch instruction, i.e., the branch instruction has passed through the address and data/ALU stages of the microprocessor 600, thus indicating a confirmed branch to a calculated target address. A third input, RETURN STACK, provides an address retrieved from the call-return stack when an RTN instruction is executed. A fourth input, PREDICTED TARGET, is a predicted target address that is calculated within the translate stage 604.

The translate stage 604 comprises translation logic which includes an instruction decoder 660, or translator 660, connected to a target address calculator 652 and a branch history table 670. The target address calculator 652 is coupled to potential overflow/underflow detection logic 654. The translate stage 604 receives inputs from the fetch stage 602 via an instruction register 640 and a current instruction pointer 636. The instruction register 640 contains an opcode field 642 and an immediate field 644. The current instruction pointer 636 contains the address of the instruction currently contained in the instruction register 640. In the case of a conditional branch instruction, the opcode field 642 directs the microprocessor 600 to perform a conditional branch operation and the immediate field 644 provides a signed relative offset. This signed relative offset specifies a memory location offset from a next sequential instruction linear address. The memory location contains a subsequent, or branch target, instruction to which program control is to be transferred if the specified condition is met. Execution of the conditional branch instruction will now be discussed.

When the conditional branch, or jump, instruction is provided by the fetch stage 602 to the translate stage 604, its opcode 642 is provided to the translation logic. The instruction decoder 660 translates the conditional branch instruction into associated micro instructions to accomplish the specified conditional jump operation. In conjunction with decode of the instruction, as the translation logic detects the conditional branch instruction, it also retrieves the address of the conditional jump instruction from the current instruction pointer 636. The address provided is used to reference an entry in the branch history table 670. The contents of the entry in the branch history table 670 indicate whether the conditional branch instruction has been previously executed, and if it has, whether previous executions have resulted in branches being taken, as described above. If the branch is predicted not taken, then a control signal 694 directs the fetch stage 602 to select the next sequential instruction linear address, NSLIP, to provide to the next instruction pointer 632. As a result, program execution will continue sequentially.

Also in conjunction with translation of the conditional jump instruction, the signed relative offset is extracted from the immediate field 644 and is used to calculate PREDICTED TARGET. If the branch is predicted taken, then control signal 694 directs the fetch stage 602 to select PREDICTED TARGET to provide to the next instruction pointer 632. Hence, sequential program execution will be discontinued and the subsequent instruction will be fetched from the predicted target address rather than the next sequential instruction address.

In an x86-compatible microprocessor, calculation of a linear address for a next sequential instruction involves the addition of three components: the current code segment base, an instruction pointer, and the length of the current instruction. The current code segment base is an address in memory defining the beginning of the code segment. The instruction pointer is an offset referenced to the current code segment base. The sum of these components is called the next sequential instruction linear address, NSLIP. Moreover, NSLIP is updated during each cycle of the microprocessor 600 so that the fetcher 630 can fetch the next sequential instruction. It follows then that calculation of the predicted target address, PREDICTED TARGET, requires the addition of four address components: the current code segment base, the instruction pointer, the length of the current instruction, and the signed relative offset, which is retrieved from the immediate field 644.

With regard to the calculation of linear addresses, an x86-compatible microprocessor can operate in one of two modes: 16-bit address size or 32-bit address size. For 32-bit address computations, all required address components are operated upon using 32-bit arithmetic, i.e., modulo $2^{32}$. However, for 16-bit address computations, all address components except the code segment base are operated upon using 16-bit arithmetic, i.e., modulo $2^{16}$; then the modulo $2^{16}$ result is added to a 32-bit code segment base to form a 32-bit linear address. Each instruction that is translated prescribes, either implicitly or explicitly, the address mode to be used for address computations. Along with prescription of the address mode, each instruction prescribes the length of its associated operands. Thus, an x86 instruction may prescribe a 16- or 32-bit address mode in conjunction with an 8-, 16-, or 32-bit operand. In 32-bit address mode, the size of a code segment can be up to $2^{32}$, however, in 16-bit address mode, the size of the code segment is limited to $2^{16}$.

As stated above, to calculate an accurate predicted target address in the translate stage requires 4-way add in the least complex case and a 3-way modulo $2^{16}$ add followed by a 2-way modulo $2^{32}$ add in the most complex case. Moreover, one skilled in the art will appreciate that, while in 16-bit address mode, to calculate a predicted target address using 32-bit arithmetic will result in an inaccurate prediction of a branch target address in only a very small number of cases. The present invention takes advantage of this fact an is thus able to calculate a predicted target address during the relatively small amount of time available in the translate stage. Since NSLIP is computed every cycle to provide for fetching of the next instruction, although not detailed in FIG. 6, NSLIP is also provided to the target address calculator 652. Since three of the four target address components have already been added together to produce NSLIP, the present invention simply adds the signed relative offset, the NSLIP, and the instruction length to calculate PREDICTED TARGET. This 3-way add is easily performed using 32-bit arithmetic and does not delay instruction execution in the translate stage. Because the signed relative offset can be 8, 16, or 32 bits in length, the target address calculator 652 sign extends it to a 32-bit signed integer to accomplish the addition.

When a conditional branch instruction is executed in 32-bit address mode, the above calculation always results in an accurate predicted target address. However, when a conditional branch instruction is executed in 16-bit address mode, the addition can result in an inaccurate predicted target address in a small number of cases. For example, if the 32-bit NSLIP is equal to 0000FFF2H and a relative offset of 000FH is provided in 16-bit address mode, the 2-way modulo $2^{32}$ addition will result in an inaccurately predicted target address of 00010001H. The accurate predicted target address is 00000001H. But since the addition was performed using 32-bit arithmetic, the half-carry from (binary) bit 15 was not ignored, as would be the case in 16-bit arithmetic, thus resulting in overflow of the segment space. Similarly, addition of a negatively signed relative offset to an NSLIP value that is near the beginning of a 16-bit segment base can result in underflowing the 16-bit segment space.

To account for the 16-bit overflow/underflow case, the present invention indicates to later stages in the pipeline that the predicted target address may be inaccurate. The potential overflow/underflow detection logic 654 detects the half-carry state resulting from the 2-way modulo $2^{32}$ addition and provides a signal 693 to address computation logic (not shown) in the address stage. The half-carry is produced at the bit position one-half the length of the current address size. In the embodiment shown in FIG. 6, the current address size is 32 bits, i.e., bits 0 through 31. Hence, the half-carry results from bit 15 of the sum. But since the signed relative offset is sign extended to a 32-bit number to perform the addition, one skilled in the art will appreciate that a half-carry is never results when a positive displacement does not overflow the 16-bit segment space and a half-carry always results when a positive displacement overflows the 16-bit segment space. Likewise, a half-carry always results when a negative sign extended displacement does not underflow the 16-bit segment space and a half-carry never results when a negative sign extended displacement underflows the 16-bit segment space. Providing the signal 693 to the address stage allows for correction of an inaccurately predicted target address once the conditional branch instruction is resolved. Provision of an accurate predicted target address is more specifically described with reference to FIG. 7.

Figure 7:
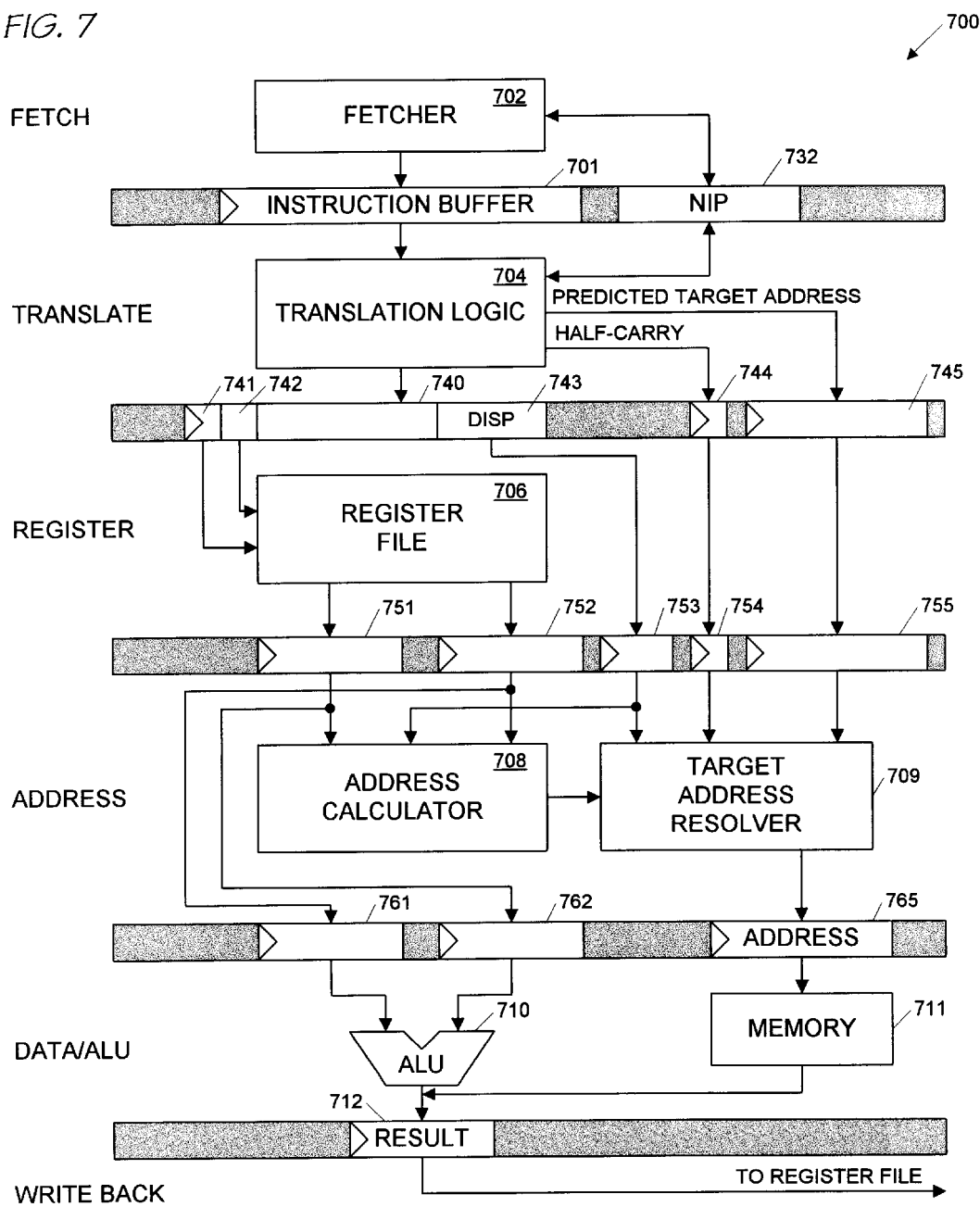
FIG. 7 is a block diagram of a pipeline microprocessor according to the present invention.

FIG. 7 is a block diagram of a pipeline microprocessor 700 according to the present invention. The microprocessor 700 includes six stages: fetch, translate, register, address, data/ALU, and write back. The fetch stage includes instruction fetch logic 702 for fetching instructions and providing the instructions to an instruction buffer 701. The instruction fetch logic 702 fetches instructions that are located at a memory address referenced by the contents of a next instruction pointer 732. The contents of the next instruction pointer 732 are determined in the manner described with reference to FIG. 6.

The contents of the instruction buffer 701 are provided to translation logic 904 that provides associated micro instructions, one at a time, to an instruction register 740. In addition to translating instructions, the translation logic 704 detects whether an instruction is a conditional branch instruction whose target address is relatively offset from a next instruction address. If it is, then a predicted target address is calculated by extracting a signed relative offset from an immediate field in instruction buffer 701 and summing this with a next sequential instruction linear address, NSLIP, as described with reference to FIG. 6. The predicted target address is then provided to the next instruction pointer 732. Recall, the target address is only selected to be used as the next instruction pointer if branch control logic within the translation logic indicates that the branch will be taken. Otherwise, the NSLIP will be used by the next instruction pointer 732 to fetch the next instruction. The predicted target address is also provided to a target address buffer 745, the use of which will be further described below. In addition, potential overflow/underflow detection logic in the translate state provides a signal to buffer 744, indicating the state of half-carry bit resulting from the 32-bit target address prediction sum. The signed relative offset for the conditional branch instruction is placed into a displacement field 743 of the instruction register 740.

The branch instruction proceeds from the instruction register 740 through the register stage, having a register file 706. If operands are required to execute a particular instruction, they are indicated by fields 741 and 742, and are retrieved from the register file 706 and stored into operand buffers 751, 752. In addition, the displacement is placed into register 753. Along with the contents of the operand buffers 751, 752, the displacement in register 753 is then provided as inputs to the address calculation logic 708. Also, the half-carry state signal in buffer 744 is transferred to register 754 and the predicted target address is passed to the address stage in register 755.

The function of the address calculation logic 708 in the address stage is to calculate addresses for memory references using the operands in registers 751, 752 and contents of register 753. A calculated address is then passed through a target address resolver 709 and placed in an address buffer 765. But in the case of the conditional jump instruction, the predicted target address was already calculated in the translate stage and forwarded to the next instruction pointer 732. Hence, all that is required is to validate the accuracy of the predicted target address. The target address resolver 709 retrieves the predicted target address from register 755, the half-carry signal from register 754, and the displacement from register 753. The direction, or sign, of the displacement is compared to the state of the half-carry signal to confirm whether the predicted target address is within the current code segment. If so, then flow of the program as provided in the translate stage to the next instruction pointer 732 is allowed to continue. If the target address resolver 709 confirms that the predicted target address is invalid, then an accurately calculated target address, received from the address calculation logic 708, is provided to the address buffer 765 in lieu of the predicted target address. In addition, contents of registers 751, 752 are provided to buffers 761, 762 for use in the data/ALU stage.

For instructions performing loads from or stores to a memory 711, the address in the address buffer 765 is used to access the memory 711. Otherwise, the address in the buffer 765 is provided to a result register 712. For instructions requiring calculation in the data/ALU stage, the contents of buffers 761, 762 are provided to ALU 710 and the specified calculation is performed. The result of the calculation is then placed in the result register 712. If specified by a given micro instruction, the contents of the result register 712 are then written into either the register file 706, or the memory 711. For branch instructions, the address in the address buffer 765 is forwarded on a bus (not shown) back to the next instruction pointer 732 to be used to fetch the next instruction. This address is referred to as EXECUTED TARGET in FIG. 6. Also during this stage, the test for the condition specified by the conditional jump instruction is performed. If the condition is met, fetching is allowed to continue as described above. If the condition is not met, then the branch control logic then provides NSLIP to the next instruction pointer 732 and flushes the pipeline to provide for the continuation of sequential instruction fetching.

What has been described thus far is an apparatus within a pipeline microprocessor that detects whether intra-segment branch instructions are being translated, and if so, calculates a predicted target address for those branch instructions within the translate stage. This allows the fetch stage to begin fetching from a calculated predicted target address, rather than from a target address associated with a previous execution of the conditional branch instruction. And, if the branch is taken, use of the apparatus eliminates the delay associated with waiting until the conditional branch instruction is resolved (in the data/ALU stage), without requiring a the complex logic of a BTB. In one embodiment, this allows an intra-segment branch, i.e., a near branch instruction, to transfer program control in just two clock cycles.

Figure 8:
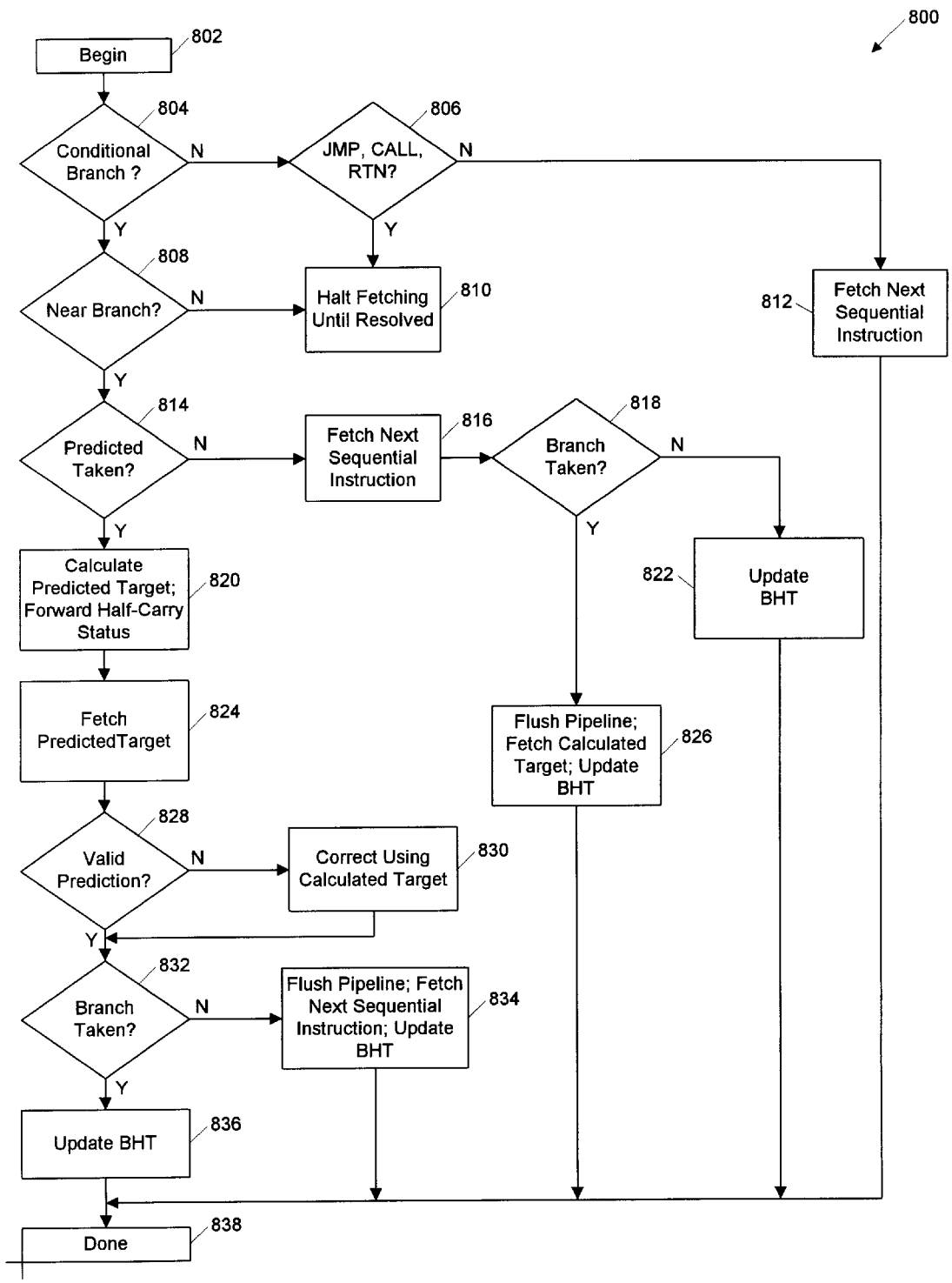
FIG. 8 is a flow chart illustrating the method for executing a branch instruction according to the present invention.

Now referring to FIG. 8, a flow chart 800 is shown that illustrates execution of an instruction through a microprocessor incorporating the target address calculation method according to the present invention.

Program flow begins at block 802 when an instruction is fetched and provided to a translator in a microprocessor. Instruction flow then proceeds to decision block 804.

At decision block 804 a determination is made whether a conditional branch instruction is specified. If not, then flow proceeds to decision block 806. If so, then flow proceeds to decision block 808.

At decision block 806 a determination is made whether the fetched instruction is a jump instruction, a call instruction or a return instruction. If the fetched instruction is not a JMP, CALL, or RTN instruction, then flow proceeds to block 812. If the fetched instruction is a JMP, CALL, or RTN instruction, then flow proceeds to block 810.

At block 812, the next sequential instruction is fetched for execution by the microprocessor. Flow then proceeds to block 838.

At decision block 808, it is determined whether the conditional branch instruction specifies an intra-segment, or near, branch. If so, then flow proceeds to decision block 814. If not, then flow proceeds to block 810.

At block 810, fetching of instructions is halted until the branch instruction is resolved.

At decision block 814, an entry in a branch history table associated with the conditional branch instruction is evaluated to determine whether it is indicated to take the branch. If the branch is predicted not taken, then flow proceeds to block 816. If the branch is predicted taken, then flow proceeds to block 820.

At block 816, because the branch was predicted not taken, the next sequential instruction is fetched. Flow then proceeds to decision block 818.

At decision block 818, at resolution, it is determined whether the branch is taken as a result of the test for the prescribed condition. If so, then flow proceeds to block 826. If not, then flow proceeds to block 822.

At block 822, the entry in the branch history table associated with the conditional branch instruction is updated to reflect the branch being not taken. Flow then proceeds to block 838.

At block 826, because sequential instruction fetching was continued in block 816 based upon a prediction that the branch would not be taken, and because resolution of the conditional branch instruction in block 818 indicates that the branch was incorrectly predicted, the pipeline is flushed and a branch target address is calculated so that fetching can be transferred to the branch target address. In addition, the entry in the branch history table associated with the conditional branch instruction is updated to reflect the branch being taken. Flow then proceeds to block 838.

At block 820, concurrent with translation of the conditional branch instruction, a predicted target address is calculated by summing a displacement for the branch with the next sequential instruction linear address. Additionally, a half-carry status signal is forwarded to indicate whether the sum is within a current segment space. Flow then proceeds to block 824.

At block 824, sequential fetching of instructions is discontinued and a subsequent instruction is fetched from the predicted target address. Flow then proceeds to decision block 828.

At decision block 828, the predicted target address is validated by comparing the sign of the displacement to the half-carry signal. If the predicted target address is valid, then flow proceeds to decision block 832. If the predicted target address is not valid, then flow proceeds to block 830.

At block 830, an accurate target address for the predicted branch is calculated and substituted for the inaccurately predicted target address. Flow then proceeds to decision block 832.

At decision block 832, the conditional branch instruction is resolved. If the resolution of the specified condition confirms that the branch is to be taken, then flow proceeds to block 836. If not, then flow proceeds to block 834.

At block 834, because the branch was incorrectly predicted as taken, and instruction fetching was transferred to the predicted target address, the pipeline is flushed and instruction fetching is transferred to the next sequential instruction. In addition, the entry in the BHT associated with the conditional branch instruction is updated to reflect the branch not being taken. Flow then proceeds to block 838.

At block 836, the entry in the BHT associated with the conditional branch instruction is updated to reflect the branch being taken. Flow then proceeds to block 838.

At block 838, the method completes.

Although the present invention and its objects, features, and advantages have been described in detail, other embodiments are encompassed by the invention. For example, variations on pipeline architecture exist, which combine some stages described in the present invention into a single stage, or separate one of the described stages into two or more stages. In addition, some microprocessors reorder the stages described as needed. The number or order of pipeline stages is not significant to the operation of the present invention. Rather, it is the actual calculation of a predicted target address during instruction decode, or prior to formal execution of a conditional branch instruction, that is of interest.

Moreover, multiple methods may be used to calculate the target address. Whether the calculation is made with an adder that is aware of the displacement size, or multiple adders that are ignorant of the displacement size, at least until after the add, or whether other mechanisms are used to perform the calculation, is not important. Furthermore, alternate branch prediction mechanisms may be employed. Described herein is a branch history table that is indexed by the address of the currently executing instruction. Alternative BHT techniques may be used, or alternative mechanisms for predicting the outcome of branch instructions may be used without departing from the spirit and scope of the present invention.

Furthermore, the target address calculator has been shown to reside within the translator. It is possible that the address calculation could be moved into a previous stage, say the fetch stage, without departing from the scope of the present invention. As long as the relative offset can be extracted from a fetched instruction, the target address can be calculated, and provided to the instruction pointer prior to resolution of the condition specified by the branch instruction.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor for executing conditional branch instructions, comprising:
    translation logic, configured to receive a conditional branch macro instruction having an associated displacement and to translate said conditional branch macro instruction into a conditional branch micro instruction, said translation logic comprising:
        a translator, configured to detect said conditional branch macro instruction;
        a target address calculator, coupled to said translator, configured to receive said associated displacement and to arithmetically compute a target address for said conditional branch macro instruction, said target address being used to fetch subsequent macro instructions, if it is predicted that a corresponding branch will be taken; and
        potential overflow/underflow detection logic, coupled to said target address calculator, configured to provide a signal to a subsequent pipeline stage within the pipeline microprocessor indicating whether said target address is within a current code segment;
    wherein said subsequent pipeline stage within the microprocessor compares said signal with a sign of said associated displacement to determine whether said target address was accurately computed, and if said target address was not accurately computed, said subsequent pipeline stage provides an accurate target address to the microprocessor, said accurate target address being used to fetch correct subsequent macro instructions; and
    wherein by calculating said target address within said translation logic, the microprocessor begins fetching macro instructions from said target address prior to said subsequent pipeline stage determining whether said target address was accurately computed.

2. The microprocessor as recited in claim 1, wherein the microprocessor is a pipeline microprocessor.

3. The microprocessor as recited in claim 1, further comprising:
    instruction fetch logic, coupled to said translator, configured to fetch instructions from a memory, said instruction fetch logic comprising:
        a next address selector, having a plurality of address inputs, for selectively providing one of said plurality of address inputs as an output; and
        a next instruction pointer, connected to said next address selector, configured to receive said output as a next instruction address.

4. The microprocessor as recited in claim 3, wherein said instruction fetch logic fetches a next instruction from said memory when said next instruction address is contained in said next instruction pointer.

5. The microprocessor as recited in claim 3, wherein said translation logic further comprises:
    branch control logic, coupled to said translator, configured to direct whether said target address will be used to fetch said subsequent macro instructions.

6. The microprocessor as recited in claim 5, wherein said branch control logic predicts whether or not said corresponding branch will be taken.

7. The microprocessor as recited in claim 5, wherein said branch control logic comprises a branch history table.

8. The microprocessor as recited in claim 7, wherein said branch history table tracks previous executions of said conditional branch macro instruction.

9. The microprocessor as recited in claim 8, wherein if said branch history table indicates that said previous executions of said conditional branch macro instruction resulted in a branch being taken, then said branch control logic directs that said target address be used to fetch said subsequent macro instructions.

10. The microprocessor as recited in claim 3, wherein said plurality of address inputs comprise:
    a next sequential instruction linear address input, for providing a next sequential instruction linear address to said next address selector; and
    a predicted target address input, in parallel with said next sequential instruction linear address input, for providing said target address to said next address selector.

11. The microprocessor as recited in claim 3, wherein said next address selector provides one of said plurality of address inputs to said next instruction pointer in response to a control signal provided by branch control logic.

12. The microprocessor as recited in claim 1, wherein said associated displacement comprises a signed relative offset.

13. The microprocessor as recited in claim 12, wherein a location in memory, offset from a next sequential instruction linear address by said signed relative offset, is required to be within said current code segment.

14. The microprocessor as recited in claim 13, wherein if said translator detects said conditional branch macro instruction, said translator provides said signed relative offset to said target address calculator.

15. The microprocessor as recited in claim 14, wherein the length of said next sequential instruction linear address is 32 bits and the length of said signed relative offset is 8, 16, or 32 bits.

16. The microprocessor as recited in claim 1, wherein said signal indicates that a sum of said associated displacement and a next sequential instruction linear address produced a half-carry.

17. The microprocessor as recited in claim 16, wherein said half-carry is produced from a bit position that is one-half the length of a current address size.

18. The microprocessor as recited in claim 17, wherein said current address size is prescribed for each instruction that is decoded by said translator.

19. A pipeline microprocessor, for executing a conditional branch operation to discontinue sequential instruction fetching and to begin instruction fetching at a branch target address, the pipeline microprocessor comprising:

translation logic, configured to receive a conditional branch macro instruction having an associated displacement, and to translate said conditional branch macro instruction into a conditional branch micro instruction, said translation logic comprising:

an instruction decoder, configured to detect whether said conditional branch macro instruction specifies the conditional branch operation directing program flow to the branch target address, the branch target address being relatively offset from a next sequential instruction linear address by a number of bytes prescribed by said associated displacement;

a target address calculator, coupled to said instruction decoder, configured to calculate the branch target address for the conditional branch operation; and potential overflow/underflow detection logic, coupled to said target address calculator, configured to provide a signal to a subsequent pipeline stage within the pipeline microprocessor indicating whether the branch target address, as calculated by said target address calculator, is within a current code segment; and a target address resolver, coupled to said potential overflow/underflow detection logic, and being within said subsequent pipeline stage, configured to determine whether the branch target address was accurately calculated by comparing a sign of said associated displacement with said signal, wherein, if it is determined that the branch target address was not accurately calculated, said target address resolver provides a corrected branch target address to instruction fetch logic in the pipeline microprocessor to enable instruction fetching at the branch target address;

wherein by calculating the branch target address within said translation logic, the pipeline microprocessor begins fetching instructions from the branch target address prior to when said target address resolver determines whether or not the branch target address was accurately calculated.

20. The pipeline microprocessor as recited in claim 19, wherein the branch target address is calculated by adding said associated displacement to said next sequential instruction linear address.

21. The pipeline microprocessor as recited in claim 20, wherein the length of said next sequential instruction linear address is 32 bits and the length of said associated displacement is 8, 16, or 32 bits.

22. The pipeline microprocessor as recited in claim 20, wherein if said instruction decoder detects that the conditional branch macro instruction specifies the conditional branch operation, said instruction decoder provides said associated displacement to said target address calculator.

23. The pipeline microprocessor as recited in claim 20, wherein said signal indicates that the adding of said associated displacement to said next sequential instruction linear address produced a half-carry.

24. The pipeline microprocessor as recited in claim 23, wherein said half-carry is produced from a bit position that is one-half the length of a current address size, said current address size being prescribed for each macro instruction that is decoded by said instruction decoder.

25. The pipeline microprocessor as recited in claim 23, wherein if said signal matches said sign, said target address resolver confirms that the branch target address was accurately calculated by said target address calculator.

26. The pipeline microprocessor as recited in claim 25, wherein if said signal does not match said sign, said target address resolver confirms that the branch target address was not accurately calculated by said target address calculator.

27. A microprocessor for calculating a target address for a conditional branch instruction, the microprocessor comprising:

instruction fetch logic, configured to fetch the conditional branch instruction from a memory;

translation logic, coupled to said instruction fetch logic, configured to receive the conditional branch instruction, and to extract a displacement from the conditional branch instruction, said translation logic comprising:

a branch table, for indicating whether or not a branch corresponding to the conditional branch instruction should be taken;

a target address calculator, coupled to said branch table, configured to calculate the target address, and to provide the target address to said instruction fetch logic for fetching of a subsequent instruction if said branch table indicates that said branch should be taken; and potential overflow/underflow detection logic, coupled to said target address calculator, configured to provide a signal to a target address resolver indicating whether the target address is within a current code segment;

wherein said target address resolver is configured to receive said signal from said potential overflow/ underflow detection logic, to confirm whether the target address is within said current code segment, and if the target address is not within said current code segment, to provide an accurate target address to said instruction fetch logic; and wherein the target address is calculated and provided to said instruction fetch logic prior to when said target address resolver confirms whether the target address is within said current code segment.

28. The microprocessor as recited in claim 27, wherein said conditional branch instruction comprises:

an opcode field, directing the microprocessor to perform a conditional branch operation; and an immediate field, coupled to said opcode field, for specifying said displacement.

29. The microprocessor as recited in claim 27, further comprising a next sequential instruction pointer, coupled to said instruction fetch logic and said target address calculator, for providing a next sequential instruction linear address to said translation logic.

30. The microprocessor as recited in claim 27, wherein, if said branch table indicates that said previous executions of said conditional branch instruction resulted in previous corresponding branches being taken, then said translation logic directs that the predicted target address is to be used to fetch said subsequent instruction.

31. A method for executing a conditional branch corresponding to a conditional branch instruction in a pipeline microprocessor, the method comprising:
- a) while the conditional branch instruction is being decoded into a conditional branch micro instruction, if branch prediction logic indicates that the conditional branch is to be taken, calculating a target address for the conditional branch, and providing a signal for use by a subsequent pipeline stage that indicates whether or not a half-carry was produced by said calculating;
- b) prior to when the conditional branch micro instruction is provided to the subsequent pipeline stage, providing the target address to an instruction fetcher for fetching of subsequent instructions;
- c) when the conditional branch micro instruction proceeds through the subsequent pipeline stage, validating whether or not the target address provided by said calculating is accurate; and
- d) if said validating indicates that the target address is not accurate, replacing the target address with an accurately calculated target address.

32. The method as recited in claim 31, wherein said calculating comprises adding a signed relative offset to a next sequential instruction linear address.

33. The method as recited in claim 32, wherein the length of the next sequential instruction linear address is 32 bits and the length of the signed relative offset is 8, 16, or 32.

34. The method as recited in claim 33, wherein said validating comprises comparing the signal to the sign of the signed relative offset.

\* \* \* \* \*